No. 697,867. Patented Apr. 15, 1902.
L. MOND.
GAS PRODUCER.
(Application filed Nov. 18, 1901.)
(No Model.)
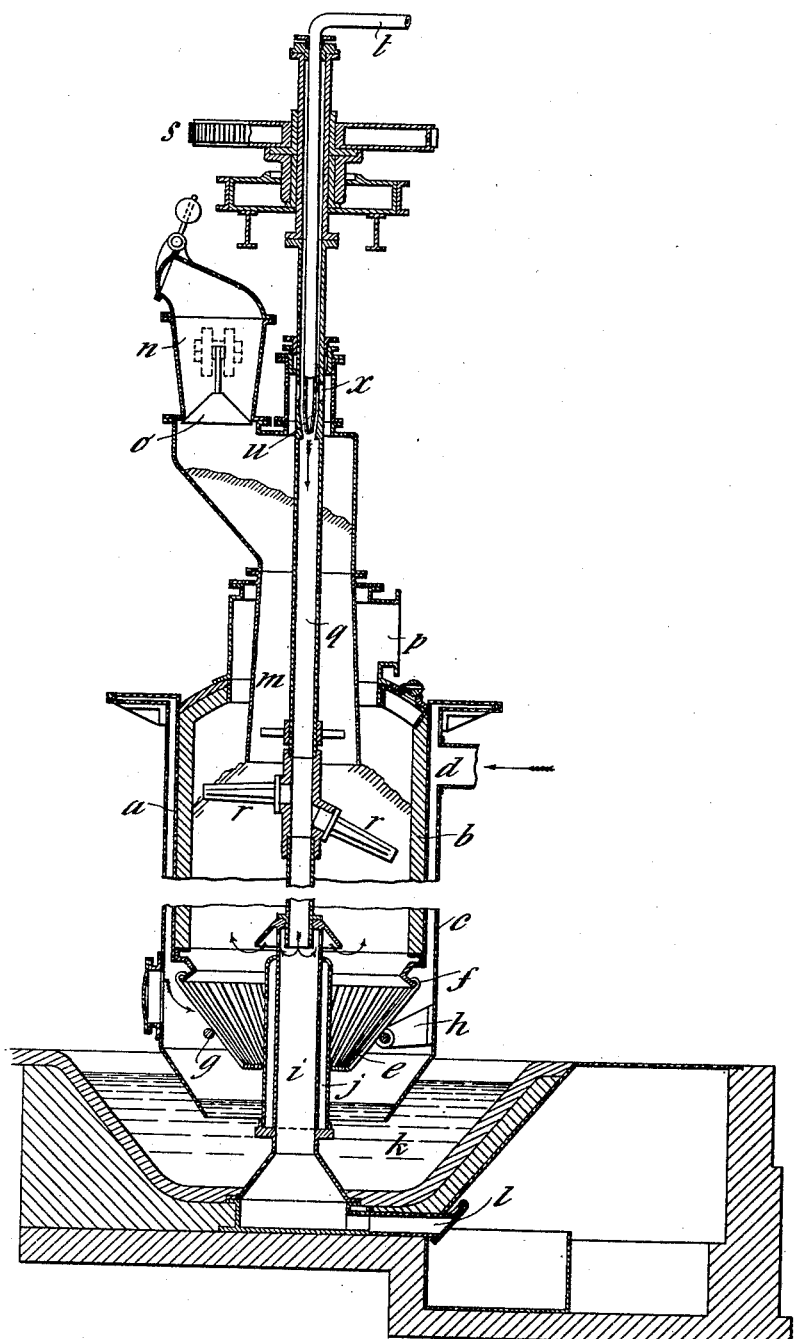

UNITED STATES PATENT OFFICE.

LUDWIG MOND, OF REGENTS PARK, LONDON, ENGLAND.

GAS-PRODUCER.

SPECIFICATION forming part of Letters Patent No. 697,867, dated April 15, 1902.

Application filed November 18, 1901. Serial No. 82,746. (No model.)

*To all whom it may concern:*

Be it known that I, LUDWIG MOND, a citizen of England, residing at 20 Avenue road, Regents Park, London, England, have invented certain new and useful Improvements in Gas-Producers, (for which I have applied for a patent in Great Britain, dated April 24, 1901, No. 8,449,) of which the following is a specification.

In the specification to my United States Patent No. 546,049, dated September 10, 1895, I have described a gas-producer specially adapted for converting ordinary slack or small coal into producer-gases containing a minimum of tarry condensable matters and obtaining as a by-product a maximum of ammonia. This gas-producer is cylindrical in form and provided with a grate of the shape of an inverted truncated cone through which the blast is admitted. In the top of the producer a bell is inserted reaching a considerable distance down into it, and this bell is always kept partly filled with the raw fuel, the volatile constituents of which are to a certain but a small extent distilled off in this bell and pass through and partly over the incandescent fuel and are thereby converted into permanent gases. The fuel thus deprived of a part of its volatile matter passes continually into the producer and the greatest part of it sinks down right underneath the bell to a considerable depth, forming an egg-shaped mass of dead fuel, while the combustion in the producer takes place between this mass of dead fuel and the walls of the producer. The bulk of the volatile matters in the fuel are thus distilled off in the center of the producer itself and have to pass through the surrounding incandescent fuel before they can escape. In this way the volatile matters in the fuel are nearly completely converted into permanent gases without destroying any noticeable part of the ammonia produced by the gasification of the fuel if the amount or character of the gasification in the fuel is not quite exceptional. For certain qualities of fuel, however, this device has not proved sufficient to produce a gas sufficiently free from tarry condensable matters; and the object of my present invention is to provide for the convenient treatment of such fuels as I shall describe, referring to the accompanying drawing, which is a vertical section of a gas-producer according to my invention modified as I shall now explain.

The body of the producer has a metal casing $a$, lined with refractory material $b$, and an outer metal casing $c$. Air is blown at $d$ into the annular space between the casings in any suitable manner, whence it passes between the fire-bars $e$ into the body of fuel. The fire-bars $e$ have their upper ends formed as hooks by which they hang from a ledge $f$ at the bottom of the inner casing, while they rest about their middle in a ring $g$, carried by three or more brackets $h$, projecting inward from the lower part of the outer casing. A central tube $i$, surrounded by a jacket $j$, in which cooling-water is caused to circulate, extends down below the ash-pit $k$ and has a side opening $l$, provided with a door, on opening which such matters as may drop down the tube $i$ can from time to time be removed. The ash-pit $k$ is charged with water, which stands at a level somewhat higher than that within the casing, which is subject to the pressure of the blast. As the means for securing a circulation of cooling-water in the jacket $j$ forms no part of the present invention, I deem it unnecessary to illustrate the same.

The fuel is fed in the usual way through a hopper $n$ and cone $o$, filling up the bell $m$ and up nearly to the hopper, while the generated gas passes away by the outlet $p$. So far as I have described, the apparatus is constructed and operates substantially in the same manner as set forth in my previous specification, above referred to.

According to my present invention I pass down the center a tubular shaft $q$, having agitating-arms $r$ projecting from it and having fixed on its upper part a wheel $s$, which is caused to revolve by any suitable motor. Into the upper end of the shaft $q$ enters, through a stuffing-box, a steam-pipe $t$, which terminates in a nozzle $u$, arranged to operate as an injector. Above the nozzle $u$ there are lateral holes $x$ in the tubular shaft, through which gas and vapors from the upper part of the producer is drawn in by the action of the injector and is forced down to the middle of the incandescent fuel a little above the fire-bars. The agitators $r$ serve to break up the fuel when it tends to cake. By thus drawing a certain quantity of the hot gas produced in the body of the producer through the fuel in the hopper the quantity of volatile and tarry matters in this fuel is reduced before the fuel enters the body of the producer to such an extent that the gas made in the body of the producer is sufficiently free from tarry matters for all practical purposes, while the tarry matters distilled off in the hopper are forced by the steam-jet in the hollow vertical shaft right through the mass of incandescent fuel inside the producer and are thus converted into permanent gas.

Having thus described the nature of this invention and the best means I know of carrying the same into practical effect, I claim—

In combination with a cylindrical gas-producer having at the top a bell containing raw fuel and at the bottom a grate in the form of an inverted truncated cone, a central hollow rotative shaft carrying agitating-arms, having at the top of the bell lateral inlets for gases and vapors, a steam-injector within it, and having at its lower end outlets for gases and vapors into the mass of incandescent fuel, substantially as and for the purpose set forth.

In testimony whereof I have hereunto set my hand in presence of two subscribing witnesses.

LUDWIG MOND.

Witnesses:
WALTER E. ROCHE,
HARRY PHILLIPS.